(12) United States Patent
Thompson

(10) Patent No.: US 7,690,128 B1
(45) Date of Patent: Apr. 6, 2010

(54) FORK ALIGNMENT TOOL

(75) Inventor: Bob Thompson, Rancho Cordova, CA (US)

(73) Assignee: Motion Pro, Inc, San Carlos, CA (US)

( * ) Notice: Subject to any disclaimer, the term of this patent is extended or adjusted under 35 U.S.C. 154(b) by 140 days.

(21) Appl. No.: 11/870,540

(22) Filed: Oct. 11, 2007

Related U.S. Application Data

(60) Provisional application No. 60/829,101, filed on Oct. 11, 2006.

(51) Int. Cl.
*G01B 5/255* (2006.01)
*G01B 21/00* (2006.01)

(52) U.S. Cl. ................ 33/613; 33/645; 33/533

(58) Field of Classification Search ............ 33/613, 33/600, 644, 645, 608, 533, 520, 203, 203.18; 73/117.01, 117.02, 117.03
See application file for complete search history.

(56) References Cited

U.S. PATENT DOCUMENTS

| | | | | |
|---|---|---|---|---|
| 621,153 | A * | 3/1899 | Schmidt | 33/203.19 |
| 640,607 | A * | 1/1900 | Wardwell | 33/203.19 |
| 1,073,042 | A * | 9/1913 | Heller | 33/203.19 |
| 1,804,448 | A * | 5/1931 | Wochner | 33/203.17 |
| RE23,730 | E | 10/1953 | Jacobsen | |
| 3,956,829 | A * | 5/1976 | Moxon | 33/203.19 |
| 4,096,636 | A | 6/1978 | Little | |
| 4,110,913 | A * | 9/1978 | Dick | 33/336 |
| RE33,302 | E | 8/1990 | Mason | |
| 5,243,765 | A * | 9/1993 | Lynch | 33/203.19 |
| 5,459,930 | A * | 10/1995 | Crisick | 33/201 |
| 5,694,699 | A * | 12/1997 | Folson | 33/645 |
| 6,438,855 | B1 | 8/2002 | Bremer | |
| 6,543,145 | B2 * | 4/2003 | Lovesy | 33/203 |
| 6,675,488 | B2 | 1/2004 | Duke | |
| 6,718,646 | B2 * | 4/2004 | Corghi | 33/520 |
| 7,007,395 | B2 | 3/2006 | Douglas | |
| 2002/0088128 | A1 * | 7/2002 | Bremer | 33/286 |
| 2003/0126917 | A1 * | 7/2003 | Miyazaki | 73/118.1 |
| 2003/0182814 | A1 * | 10/2003 | Duke | 33/203 |
| 2008/0100028 | A1 * | 5/2008 | Mrdeza et al. | 280/280 |

OTHER PUBLICATIONS

Ausherman, Duane—BMW Motorcycle Fork Alignment Tools, http://w6rec.com/duane/bmw/forktools.

\* cited by examiner

*Primary Examiner*—Yaritza Guadalupe-McCall
(74) *Attorney, Agent, or Firm*—Patent Law Office of Larry Guernsey; Larry B. Guernsey

(57) ABSTRACT

A tool is disclosed for alignment of forks in a wheeled vehicle. The tool includes a plurality of connecting members, each having a receiving cup, which is configured to receive the curvature of fork tubes of the forks of the vehicle, and a slide bar which attaches to a portion of the receiving cup. The connecting members are held in slidable relation to each other by at least one fastener when the fastener is loosened. The fastener can be tightened to lock the connecting members in fixed position relative to each other to capture the spatial separation dimension between the forks at a point along their length. Also disclosed is a method for achieving parallelism of forks in a wheeled vehicle.

12 Claims, 4 Drawing Sheets

FORK ALIGNMENT TOOL

The following is a non-provisional patent application which claims priority to provisional application 60/829,101 filed Oct. 11, 2006 to the same inventor.

TECHNICAL FIELD

The present invention relates generally to tools for aligning mechanical parts and more particularly for aligning the forks of a motorcycle wheel.

BACKGROUND ART

Motorcycles are a popular means of recreation and transportation for a number of people. Being a two-wheeled vehicle, the suspension of the motorcycle is very important for proper operation. If the suspension is not working properly, the handling characteristics of the motorcycle and the way it absorbs bumps are dramatically affected. In order to insure that the suspension is working properly it is imperative that the forks must be aligned to be very parallel with each other. It is well known that every time the front wheel is removed and replaced the forks need to be aligned which in most cases is done by working the suspension up and down a few times before tightening the fork leg to the front axle. Additionally, some forks have been found to be out of alignment when received from the factory.

This misalignment largely results when the forks are not parallel along their length. This property will be referred to in this discussion as "parallelism". Parallelism can be measured from the centerline of each fork at various points along their lengths. However, this can be somewhat difficult, as the forks are generally configured as cylindrical tubes. Determining the center point can be difficult on a curved object, and thus a gauge configured to mate with a curved surface can greatly simplify an alignment operation.

The structure of a motorcycle fork can be more easily understood with reference to FIG. 4 which shows a very simplified view of the main elements of a motorcycle fork. No attempt has been made to draw the various elements in proper scale or proportion to each other.

FIG. 4 shows a front plan view of a motorcycle fork 52, with the front wheel 54 mounted on axle 56. The fork 52 includes two fork tubes 58, which connect to two fork legs 60, which are sometimes manufactured to be telescopically retractable within the fork tubes 58. The fork 52 can also be thought of as having a left fork 62 and a right fork 64, which are joined by various clamps to maintain their parallelism. A top clamp 66, and lower clamp 68 (also called a triple tree), connect the left fork 62 and right fork 64, in addition to the axle 56, which is held in axle clamps 72 by pinch bolts 70. Thus, there are three cross-pieces that join the left fork 62 and right fork 64 and maintain the parallelism between them. The spacing at the top clamp 66, and lower clamp 68 and axle clamps 72 are largely fixed, but may be adjustable to some degree. Thus, alignment of the forks 52 includes measuring the distance between centerlines of the fork tubes 58 and fork legs 60, and fastening the pinch bolts 70 of the axle clamps 72 to lock them into place.

As referred to above, determining the centerline of the curved tubes 58 and legs 60 can be difficult using linear measuring devices, such as tape measures, etc. Thus there exists a need for a gauge that can easily establish the proper spacing between the fork legs 60 and can be easily used to place the forks 52 into parallel alignment, so that they may be locked into place.

DISCLOSURE OF INVENTION

Accordingly, it is an object of the present invention to provide a tool which aids in the proper alignment of the front forks of a motorcycle.

Another object of the invention is to provide a gage which can easily establish the appropriate spacing of the forks at various places along their length.

And another object of the invention is to provide a tool which fits easily with the forks.

A further object of the present invention is to provide a tool with receiving bracket which easily centers on the forks and provides a fit which can be "felt" or seen rather than relying on measurement calibrations.

An additional object of the present invention is to provide an alignment tool which is easily adjustable to required dimensions, and which locks securely to maintain these required dimensions.

Yet another object of the present invention is to provide a tool which is simple in design, and easy to manufacture.

A yet further object of the present invention is to provide a tool which is easy to operate.

Briefly, one preferred embodiment of the present invention is a tool for alignment of forks in a wheeled vehicle. The tool includes two or more connecting members, each having a receiving cup, which is configured to receive the curvature of fork tubes of the forks of the vehicle, and a slide bar which attaches to a portion of the receiving cup. The connecting members are held in slidable relation to each other by at least one fastener is loosened. The fastener can be tightened to lock the connecting members in fixed position relative to each other to capture the spatial separation dimension between the forks at a point along their length. Also disclosed is a method for achieving parallelism of forks in a wheeled vehicle.

An advantage of the present invention is that it includes receiving cups which are configured to easily mate with the curved surfaces of the fork tubes and fork legs.

Another advantage of the present invention is that it includes connecting members which easily slide relative to each other to capture the spacing dimension of the fork tubes and fork legs at particular points along their length.

And another advantage of the present invention is that the connecting members are easily locked into position relative to each other to maintain the captured spatial dimension.

A further advantage of the present invention is that the connecting members are optionally configured as identical parts which are turned in opposite directions and joined by a sliding slot and fasteners.

A yet further advantage of the present invention is that by using a single type of connecting member, manufacturing costs are decreased.

Yet another advantage of the present invention is that it can alternatively be manufactured by extrusion to minimize costs.

Another advantage of the present invention is that it is small enough to fit between the spokes of a motorcycle wheel so the spacing between the fork legs can be checked as close to the front axle as possible.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which.

BEST MODE FOR CARRYING OUT THE INVENTION

Figure 1:
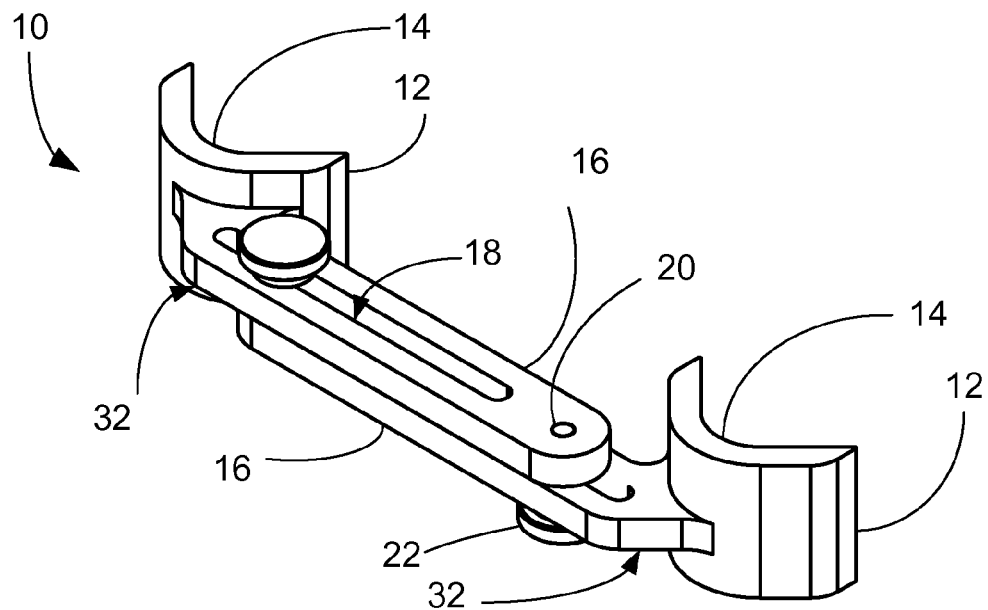
FIG. 1 shows an isometric view of a first embodiment of the alignment tool of the present invention.
Figure 2:
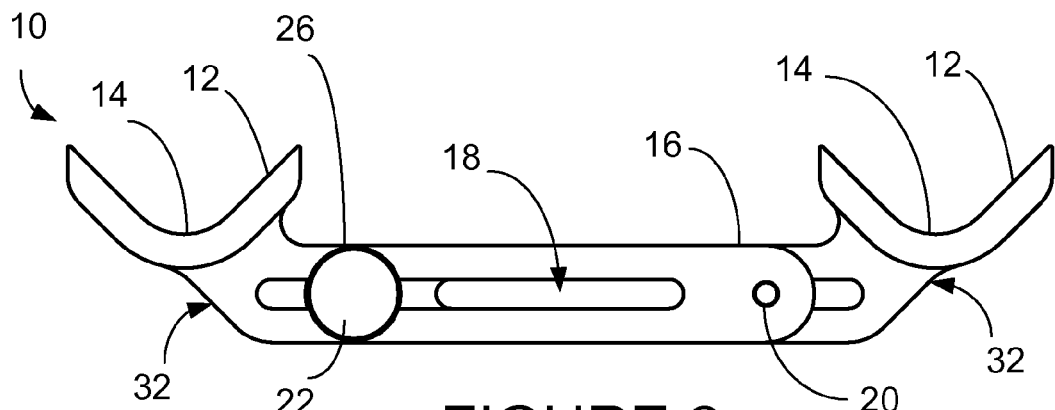
FIG. 2 shows a top plan view of a first embodiment of the alignment tool of the present invention.
Figure 3:
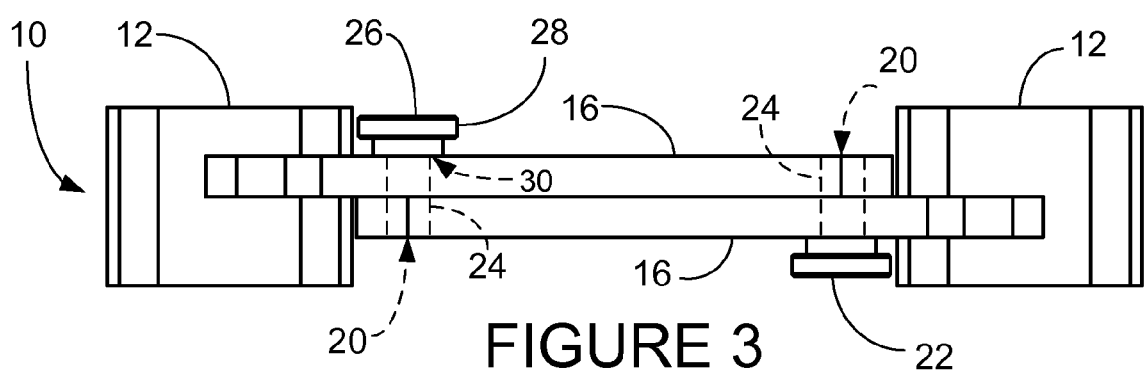
FIG. 3 shows a front plan view of a first embodiment of the alignment tool of the present invention.
Figure 4:
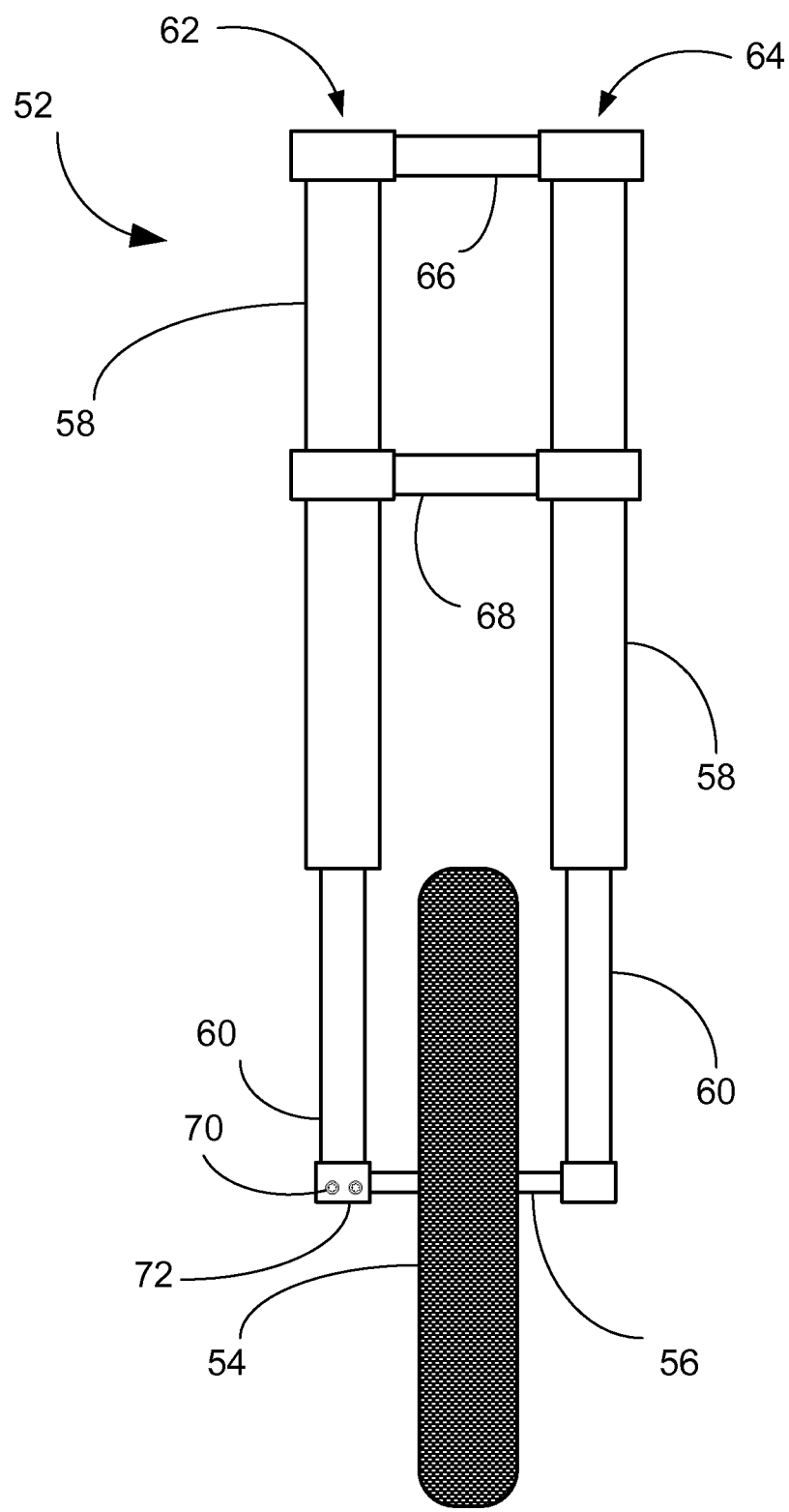
FIG. 4 shows a simplified front plan view of a motorcycle forks and front wheel.

The present invention is an adjustable alignment tool for aligning the forks of a motorcycle, which will be referred to by the reference number 10, and thus, for simplicity, shall be referred to as alignment tool 10. A first embodiment of the alignment tool 10 is illustrated in FIGS. 1-3, of which FIG. 1 is a perspective view, FIG. 2 is a top plan view, and FIG. 3 is a front plan view. FIG. 4 will also be referred to in the following discussion.

Generally, a first embodiment of the alignment tool 10 includes two receiving cups 12, which are each configured with a concave portion 14 which is shaped to receive the cylindrical shape of the fork tubes 58 (see FIG. 4). Each of the receiving cups 12 is connected to a slide bar 16, each of which preferably surrounds a slot 18. The slide bars 16 are laid adjacent to each other so that the included slots 18 are aligned. Each slide bar 16 is configured with a threaded screw hole 20. Two fasteners 22 are included which each have a male threaded portion 24. Each of these male threaded portions 24 fits through a portion of the two slots 18 and into one of the threaded screw holes 20. The fasteners 22 each also include a head portion 26, preferably having a texture area 28 for easier gripping. Each fastener 22 also has a contacting portion 30 which will contact the surface of the slide bar 16, when the fastener 22 is screwed down into the threaded screw hole 20. Thus, when the fasteners 22 are loosened, the receiving cups 12 may be moved further apart or closer together to fit the spacing of the fork tubes 58. Once this spacing is established, the head portion 26 of the fasteners 22 are grasped by the user and the fasteners 22 tightened to lock the slide bars 16 from further movement. The receiving cups 12 are thus locked into a fixed spacing that reflects the spacing of the fork tubes 58 at the point at which they were first measured, preferably near the top clamp 66 or lower clamp 68. The alignment tool 10 can then be repositioned near the bottom of the fork legs 60 near the axle 56 and the spacing of the fork legs 60 at this point established before the pinch bolts 70 on the axle clamp 72 are locked in place.

The receiving cups 12 and slide bars 16 are preferably configured as part of the same combined structure, which will be referred to here together here as a connecting member 32. It will be noted in the embodiment illustrated here that there are two connecting members 32 included which are essentially identical, but one is flipped vertically from the other before their slide bar 16 portions are laid together with their slots 18 matching. For ease of manufacture, this is preferred, since there is only one configuration of connecting member 32 required, but this is not to be taken as a limitation. It will be obvious to one skilled in the art that many other configurations of connecting members could be used, which are not symmetrical with each other. It is also possible that there be more than two connecting members joined, or that there be more or fewer than two fasteners employed to lock the connecting members in place. The shape of the receiving cups is also subject to much variation, as are the fasteners themselves. It will be obvious to one skilled in the art that what is required is two receiving cups of some sort, which can engage the fork tubes and be locked into a fixed spacing relative to each other which can then be used to determine the spacing at other points on the fork tubes or fork legs. This can be accomplished by many variations of alignment tool, and all are contemplated by the present invention.

Figure 7:
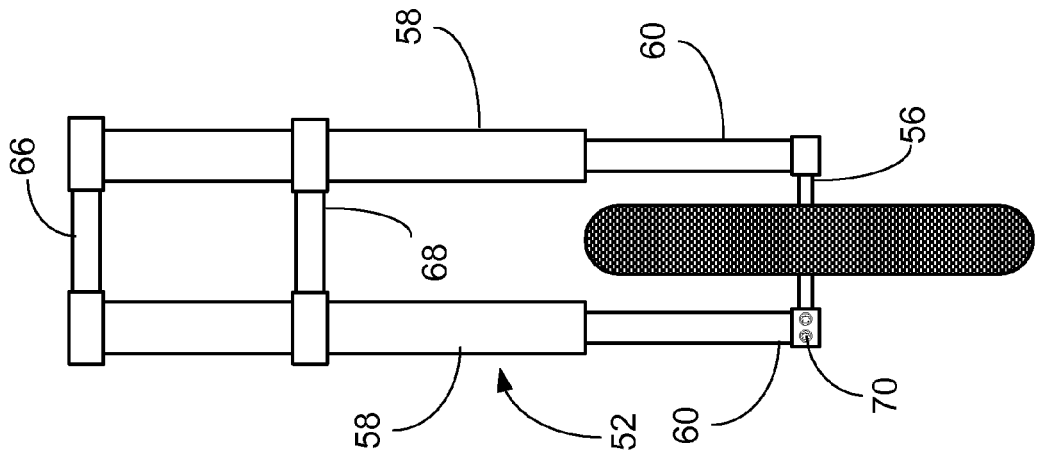
FIGS. 5-7 shows simplified front plan views of a motorcycle forks and front wheel in various stages of alignment using the alignment tool of the present invention.
Figure 6:
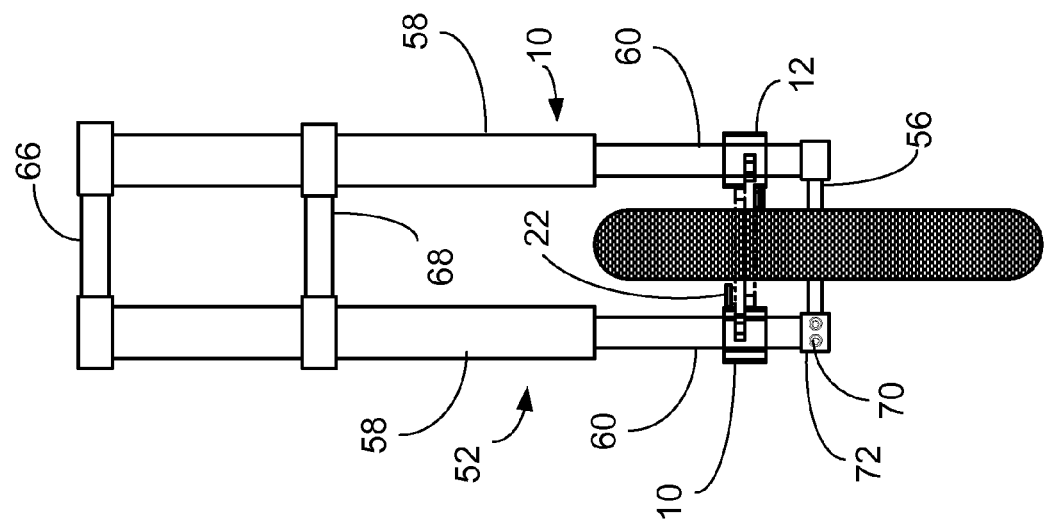
Figure 5:
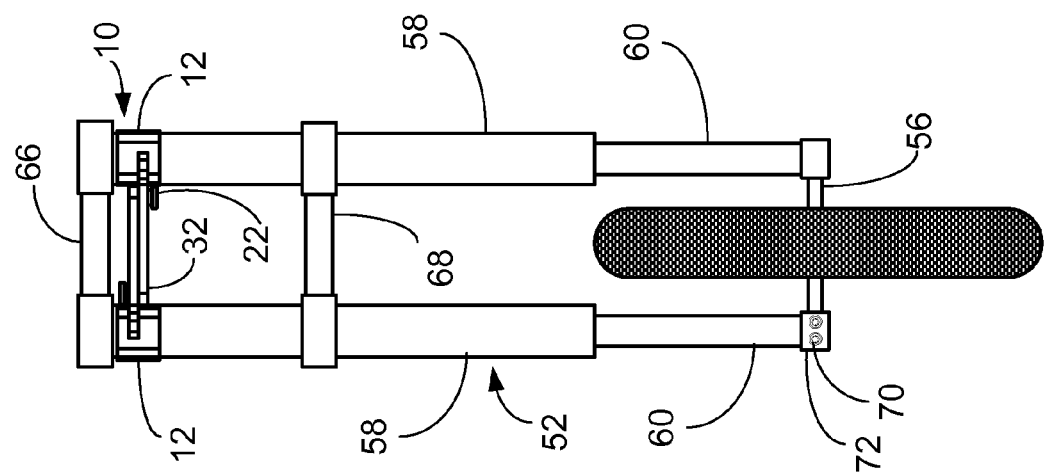

FIGS. 5-7 demonstrate one of several methods for aligning the forks of a motorcycle using the alignment tool of the present invention. The alignment tool 10 is first placed against the fork tubes 58 as close as possible to one of the triple clamps, in this case, near the top clamp 66. At this point, the fasteners 22 are loosened so the two connecting members 32 are free to slide farther apart or closer together until the receiving cups 12 fit onto the fork tubes 58. When setting the alignment tool 10, it can be positioned on a straight or tapered portion of the forks 52. While holding the alignment tool 10 tightly and square to the forks 52, the two fasteners 22 are tightened.

It is important that the initial adjustment is correct. There are two ways of verifying this. First, the user can sight down the receiving cups 12 to make sure no light is seen between either side of the receiving cups 12 and the fork tube 58. A second method is to hold one side of the alignment tool 10 tight to one fork tube 58 and tap the other side of the alignment tool 10 while listening for good solid contact between the receiving cup 12 of the alignment tool 10 and the fork tube 58.

As shown in FIG. 6, after the initial measurement has been captured by the alignment tool 10, the alignment tool 10 is positioned as close as possible to the axle 56. The alignment tool 10 is held tightly against the fork legs 60, making sure that both fork legs 60 are in complete contact with both receiving cups 12. The pinch bolts 70 of the axle clamp 72 are then tightened. The correct spacing of the fork legs 60 is thus assured, as shown in FIG. 7.

For the best suspension performance, the alignment tool 10 should be used every time the front wheel is remounted to the bike.

Figure 8:
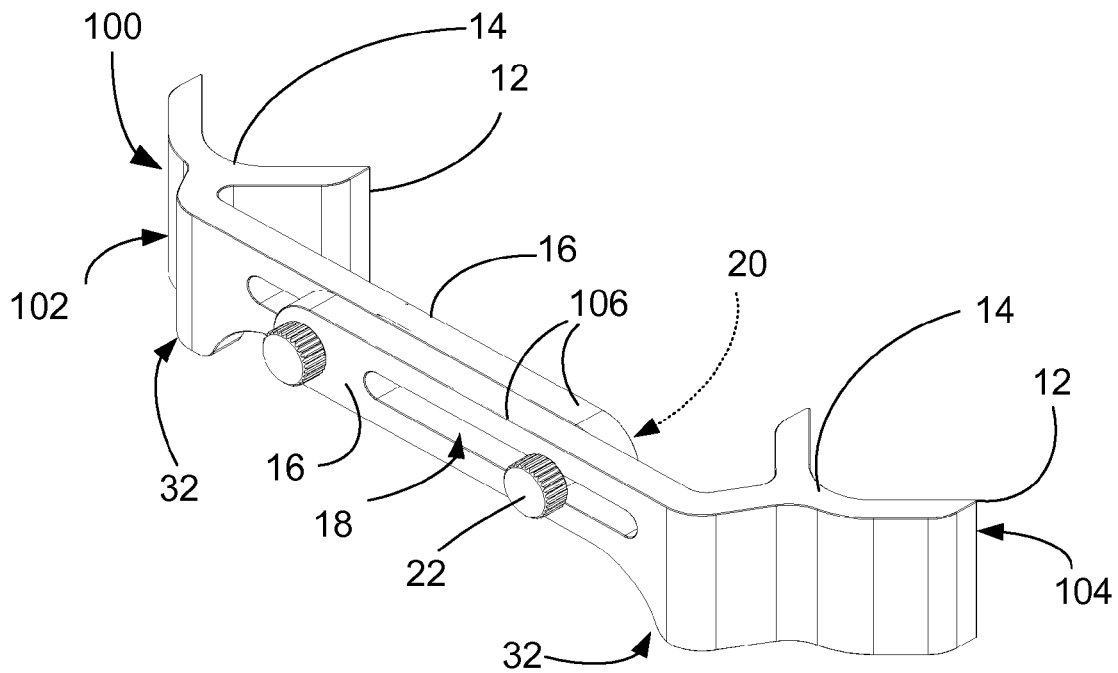
FIG. 8 shows an isometric view of an alternate embodiment of the alignment tool of the present invention.
Figure 9:
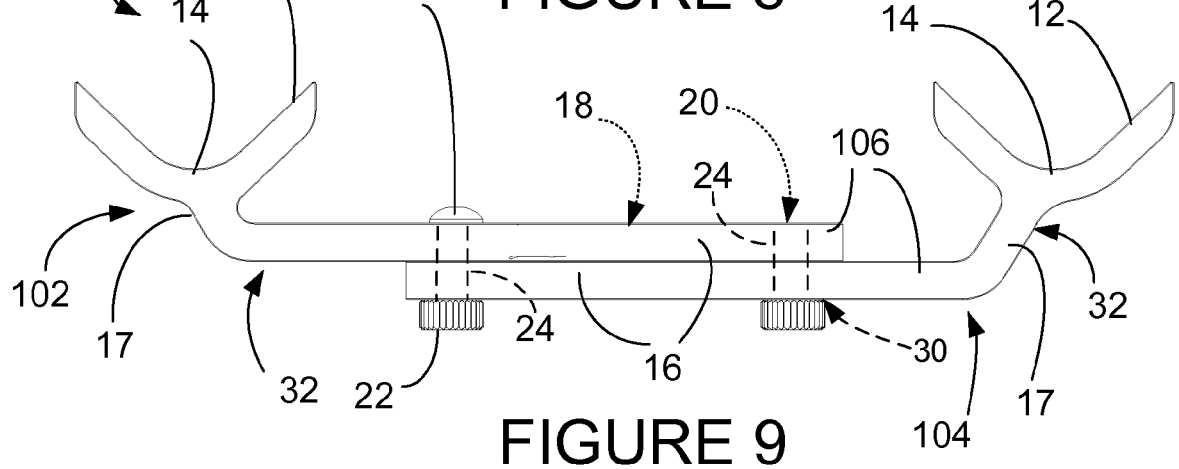
FIG. 9 shows a top plan view of an alternate embodiment of the alignment tool of the present invention.
Figure 10:
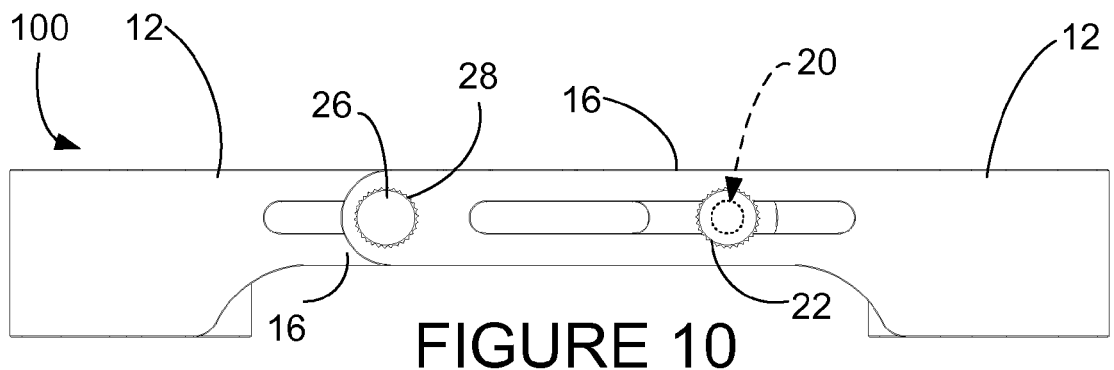
FIG. 10 shows a front plan view of an alternate embodiment of the alignment tool of the present invention.

FIGS. 8-10 show an alternate embodiment of the alignment tool of the present invention, which shall be designated by the number 100. It utilizes many of the same elements as the earlier described embodiment 10, although certain elements are configured differently. In order to aid in understanding, elements which perform similar functions will be designated by the same element numbers as previously when possible.

It has been found that the cost to manufacture the component parts for the alignment tool 100 is decreased if the parts are made by extrusion. Thus it is advantageous that the connecting members 32 have a simplified profile when seen from a top plan view, as in FIG. 9. This can result in a pair of connecting members 32 having a first member 102 and a second member 104 which are a non-identical pair 106. It will also be obvious to one skilled in the art, that these connecting members could also be configured to be identical, as in the first embodiment 10, with appropriate modifications.

As shown in the perspective view of FIG. 8, the alternate alignment tool 100 includes two receiving cups 12, which are again each configured with a concave portion 14 and are each connected to a slide bar 16, each of which preferably surrounds a slot 18. The receiving cups 12 may be connected to the slide bars 16 by necks 17 which are preferably of different lengths, but this is not to be taken as a limitation.

The slide bars 16 are laid adjacent to each other so that the included slots 18 are aligned. One slide bar 16 is configured with a threaded screw hole 20, and the other includes a carriage bolt 108, which is prevented from turning by the slot 18, and engages the threaded fastener 22. The fasteners 22 each also include a head portion 26, preferably having a texture area 28 for easier gripping. Each fastener 22 also has a contacting portion 30 which will contact the surface of the slide bar 16, when the fastener 22 is screwed down. Thus, when the fasteners 22 are loosened, the receiving cups 12 may be moved further apart or closer together to fit the spacing of the fork tubes 58. Once this spacing is established, the head portion 26 of the fasteners 22 are grasped by the user and the fasteners 22 tightened to lock the slide bars 16 from further movement. As before, the receiving cups 12 are thus locked into a fixed spacing that reflects the spacing of the fork tubes 58 at the point at which they were first measured, preferably near the top clamp 66 or lower clamp 68. The alignment tool 100 can then be repositioned near the bottom of the fork legs 60 near the axle 56 and the spacing of the fork legs 60 at this point established before the pinch bolts 70 on the axle clamp 72 are locked in place.

Also as before, the receiving cups 12 and slide bars 16 are preferably configured as part of the same combined structure, which will again be referred to here as a connecting member 32. It will be noted in the embodiment 100 illustrated here that there are two connecting members 32 included which are a non-identical pair 106, and their slide bar 16 portions are laid together with their slots 18 matching.

The fork alignment is conducted in the same manner as described above in relation to the earlier embodiment 10.

While various embodiments have been described above, it should be understood that they have been presented by way of example only, and not limitation.

INDUSTRIAL APPLICABILITY

The present fork alignment tool 10, 100 is well suited generally for aligning the forks of a motorcycle or other two-wheeled vehicle, in which the forks on which the front wheel is mounted must be aligned to be very parallel with each other. It is well known that every time the front wheel is removed and replaced the forks need to be aligned which in most cases is done by working the suspension up and down a few times before tightening the fork leg to the front axle. Additionally, some forks have been found to be out of alignment when received from the factory. A tool which can facilitate this operation will have great utility and industrial applicability.

One of several methods for aligning the forks of a motorcycle using the alignment tool 10, 100 of the present invention is illustrated in FIGS. 5-7. The alignment tool 10, 100 is first placed against the fork tubes 58 as close as possible to one of the triple clamps, in this case, near the top clamp 66. At this point, the fasteners 22 are loosened so the two connecting members 32 are free to slide farther apart or closer together until the receiving cups 12 fit onto the fork tubes 58. When setting the alignment tool 10, 100, it can be positioned on a straight or tapered portion of the forks 52. While holding the alignment tool 10, 100 tightly and square to the forks 52, the two fasteners 22 are tightened.

It is important that the initial adjustment is correct. There are two ways of verifying this. First, the user can sight down the receiving cups 12 to making sure no light is seen between either side of the receiving cups 12 and the fork tube 58. A second method is to hold one side of the alignment tool 10, 100 tight to one fork tube 58 and tap the other side of the alignment tool 10, 100 while listening for good solid contact between the receiving cup 12 of the alignment tool 10, 100 and the fork tube 58.

As shown in FIG. 6, after the initial measurement has been captured by the alignment tool 10, 100, the alignment tool 10, 100 is positioned as close as possible to the axle 56. The alignment tool 10, 100 is held tightly against the fork legs 60, making sure that both fork legs 60 are in complete contact with both receiving cups 12. The pinch bolts 70 of the axle clamp 72 are then tightened. The correct spacing of the fork legs 60 is thus assured, as shown in FIG. 7.

For the above, and other, reasons, it is expected that the fork alignment tool 10, 100 of the present invention will have widespread industrial applicability. Therefore, it is expected that the commercial utility of the present invention will be extensive and long lasting.

What is claimed is:

1. A tool for alignment of forks in a wheeled vehicle, comprising:
a plurality of connecting members, each having a receiving cup, which is configured to receive the curvature of fork tubes of said forks and a slide bar which attaches to a portion of said receiving cup, where said slide bars are in direct contact with each other and are held in slidable relation to each other by at least one fastener when said fastener is loosened, and where said at least one fastener can be tightened to lock said connecting members in fixed position relative to each other to capture the spatial separation dimension between said forks at a point along their length.

2. The tool of claim 1 wherein:
said plurality of connecting members consists of two connecting members.

3. The tool of claim 2 wherein:
said two connecting members are substantially identical.

4. The tool of claim 2 wherein:
said two connecting members include a first member and a second member which are non-identical.

5. The tool of claim 4 wherein:
said first member and said second member are included in a non-identical pair.

6. The tool of claim 2 wherein:
said slide bars of said connecting members include a slot.

7. The tool of claim 6 wherein:
one connecting member of said two connecting members is flipped vertically from the other and their slide bar portions are laid together with their slots aligned.

8. The tool of claim 2 wherein:
said slide bars of said connecting members further include at least one threaded screw hole.

9. The tool of claim 8 further comprising:
at least one fastener, each of which includes a male threaded portion which fits through a portion of said aligned slots and into said at least one threaded screw hole in the other of said connecting members.

10. A method of achieving parallelism of forks of a vehicle, having an axle, and an axle clamp having pinch bolts, where said forks include a first tube and a second fork tube, and triple clamps including a top clamp:

A) providing a fork alignment tool having a plurality of connecting members, which include a first receiving cup, and a second receiving cup, which are configured to receive the curvature of fork tubes of said forks and a slide bar which attaches to a portion of said receiving cup, where said connecting members are held in slidable relation to each other by at least one fastener when said fastener is loosened, and where said at least one fastener can be tightened to lock said connecting members in fixed position relative to each other to capture the spatial separation dimension between said forks at a point along their length;

B) loosing said fasteners so that said connecting members are free to slide farther apart or closer together and placing said alignment tool against said first fork tubes in proximity to said top triple clamp;

C) holding the alignment tool square to the forks and tightening said fasteners to capture an initial measurement;

D) verifying that the initial adjustment is correct;

E) positioning said alignment tool in proximity to said axle; and

F) tightening said pinch bolts of the axle clamp.

11. The method of achieving parallelism of claim 10, wherein D further comprises:

i) sighting down said receiving cups to make sure no light is seen between said receiving cups and said fork tube.

12. The method of achieving parallelism of claim 10, wherein D further comprises:

i) holding said first receiving cup of said alignment tool tight to said first fork tube; and ii) tapping said second receiving cup of said alignment tool while listening for good solid contact between said second receiving cup of said alignment tool and said second fork tube.

\* \* \* \* \*